(12) United States Patent
Neuscheler et al.

(10) Patent No.: US 8,423,236 B2
(45) Date of Patent: Apr. 16, 2013

(54) SYSTEM FOR DETECTING A WHEEL MOTION

(75) Inventors: Marco Neuscheler, Reutlingen (DE); Axel Wenzler, Leonberg (DE)

(73) Assignee: Robert Bosch GmbH, Stuttgart (DE)

( * ) Notice: Subject to any disclaimer, the term of this patent is extended or adjusted under 35 U.S.C. 154(b) by 551 days.

(21) Appl. No.: 12/308,473

(22) PCT Filed: Sep. 19, 2007

(86) PCT No.: PCT/EP2007/059891
§ 371 (c)(1),
(2), (4) Date: Aug. 13, 2010

(87) PCT Pub. No.: WO2008/058790
PCT Pub. Date: May 22, 2008

(65) Prior Publication Data
US 2011/0130919 A1    Jun. 2, 2011

(30) Foreign Application Priority Data
Nov. 17, 2006  (DE) .......................... 10 2006 054 317

(51) Int. Cl.
G06F 19/00    (2011.01)
(52) U.S. Cl.
USPC ....................................... 701/33.4; 73/146.3

(58) Field of Classification Search ................. 701/33.4; 340/442, 444, 10.4, 539.1; 73/146.3, 146.2, 73/146.5, 146.8, 146, 146.4; 152/152.1
See application file for complete search history.

(56) References Cited

U.S. PATENT DOCUMENTS

| | | | |
|---|---|---|---|
| 5,545,070 A * | 8/1996 | Liu | 446/104 |
| 5,774,047 A * | 6/1998 | Hensel, IV | 340/442 |
| 5,883,305 A * | 3/1999 | Jo et al. | 73/146.5 |
| 6,218,936 B1 * | 4/2001 | Imao | 340/447 |
| 2005/0156722 A1 | 7/2005 | McCall et al. | |
| 2006/0161327 A1 | 7/2006 | Emmerich et al. | |

FOREIGN PATENT DOCUMENTS

| | | |
|---|---|---|
| DE | 197 53 971 | 6/1999 |
| DE | 10 2004 042 191 | 2/2006 |
| DE | 10 2005 002 240 | 7/2006 |
| WO | WO 2005/070707 | 8/2005 |

* cited by examiner

*Primary Examiner* — Thomas Black
*Assistant Examiner* — Marthe Marc-Coleman
(74) *Attorney, Agent, or Firm* — Kenyon & Kenyon LLP

(57) ABSTRACT

In a method for detecting a rolling motion of a wheel in a motor vehicle, a wheel acceleration variable characterizing a wheel acceleration is recorded using at least one sensor element, the wheel acceleration variable is scanned at various scanning points in time, and the presence of a rolling motion is detected with the aid of the scanned values. The wheel acceleration variable is scanned in a cycle, including at least three scanning points in time, of nonequidistant points in time.

26 Claims, 5 Drawing Sheets

SYSTEM FOR DETECTING A WHEEL MOTION

BACKGROUND OF THE INVENTION

1. Field of the Invention

The present invention relates to a method and a device for detecting the rolling movement of a wheel in a vehicle or motor vehicle.

2. Description of Related Art

Tire pressure monitoring systems are known in modern motor vehicles. These monitoring systems, as a rule, include several pressure sensors which are mounted to the wheels of the vehicles, in common with transmitting electronics. In case of a pressure drop, a radio signal is sent to a control unit. However, for the purpose of monitoring the sensor system, a signal is also cyclically sent, as a rule, without there being a pressure loss. The pressure sensor, complete with signal evaluation and transmitting unit, is mostly fed by a battery that is also installed in the wheel.

For the broadening of the functioning of the sensor, a rolling detection is frequently used, that is, a system which recognizes whether the wheel is turning or not. This function is meaningful, for example, in order to:

save energy, that is, the sensor transmits only in active operation, avoid the possibility of the influence of other systems in one's own vehicle or in other vehicles when at a standstill, the like applying if the wheel is only being carried along as a spare wheel in the vehicle.

Such a setup is described, for example, in published German patent document DE 10 2005 002 240. From this document, a device is known for measuring a vehicle movement. It includes an acceleration sensor arranged at the wheel and an associated evaluation circuit. This sensor system operates especially accurately and reliably if the acceleration sensor is mounted on the wheel in such a way that the main sensing direction lies essentially in the tangential direction of the wheel.

Published German patent document DE 197 53,971 also discloses a method for detecting a rolling motion of a wheel in a motor vehicle.

BRIEF SUMMARY OF THE INVENTION

The present invention provides a method for detecting a rolling motion of a wheel in a motor vehicle in which a wheel acceleration variable characterizing a wheel acceleration is recorded using at least one sensor element, the wheel acceleration variable is scanned at various scanning points in time and the presence of a rolling motion is detected with the aid of the scanned values.

The crux of the present invention is that the wheel acceleration variable is scanned in a cycle or a scanning cycle or a series or a succession or a sequence, including at least three scanning points in time, of predetermined, nonequidistant points in time. Because of the use of predetermined, nonequidistant scanning points in time, the possibility opens up of carrying out a sure rolling detection using a much lower number of scanning points compared to an equidistant scanning.

One advantageous embodiment of the present invention is characterized in that the wheel acceleration variable is essentially a radial acceleration occurring at the wheel, or essentially a tangential acceleration.

One advantageous embodiment of the present invention is characterized by the wheel acceleration variable having at least one component that refers to a radial acceleration.

In the last-mentioned application, the properties are utilized that, independently of the alignment of the sensors, that is, independently of whether their measuring direction points in the radial direction, the tangential direction or a linear combination of these directions, a sinusoidal output signal is consistently generated which has superimposed on it a constant offset value that is a function of the radial component of the sensor alignment.

One advantageous embodiment of the present invention is characterized in that the nonequidistant scanning points in time within the cycle are arranged in time in such a way that the distances in time of two successive adjacent scanning points in time becomes less and less. This selection of the scanning points in time has proven, in experiments, to be particularly suitable.

One advantageous refinement of the present invention is characterized by the fact that the maximum value, recorded within the cycle, of the wheel acceleration variable, that is ascertained by scanning, is ascertained, the minimum value, recorded within the cycle, of the wheel acceleration variable, that is ascertained by scanning, is ascertained, the difference between the maximum value and the minimum value is ascertained and the presence of a rolling motion is detected with the aid of the difference.

One advantageous embodiment of the present invention is characterized in that a rolling motion is detected as being present when the difference exceeds a specified threshold value.

One advantageous embodiment of the present invention is characterized by the scanning cycle being repeated at specified points in time.

One advantageous refinement of the present invention is characterized in that the method is applied within the scope of a tire pressure monitoring system and the operating mode of the tire pressure monitoring system is dependent on whether a rolling motion has been detected as being present.

One advantageous embodiment is characterized in that, in the case of a rolling motion not being detected as being present, that is, there is no wheel rotation, the tire pressure values ascertained by the tire pressure monitoring system are not transmitted, or are transmitted at greater time intervals than if a wheel rotation had been present. This makes possible an energy-saving operation of the tire pressure monitoring system.

One advantageous refinement of the present invention is characterized in that the sensor element is a piezoceramic sensor element.

Another advantageous embodiment of the present invention is characterized in that the piezoceramic sensor element has a capacitor connected in parallel to it.

In common with the sensor element and possibly additionally present component parts, the capacitor forms a passive circuit having a frequency response (a type of bandpass) which is essentially determined additionally by this capacitance. The capacitance makes possible the observation of the sensor signals and their coupling out via the switches, without the sensor element being short circuited in the process. Consequently, a type of impedance conversion takes place; piezo-elements are extremely high-ohmic. That being the case, the capacitor has the following tasks:

frequency response or filtering response, even without having current traverse the system the charge on the capacitor is used as input for subsequent Q/U conversion (gain stage)

The capacitor is required for carrying out a type of impedance conversion; without the capacitor, very large time constants appear in the reading out of the sensor, which counter the requirement of supplying the circuit with power for only a short time.

One advantageous refinement of the present invention is characterized in that the detection of the presence of a rolling motion takes place using an electronic circuit and the electronic circuit is supplied with current only during the scanning points in time.

This makes possible an energy-saving operation.

Yet another advantageous embodiment of the present invention is characterized in that the electronic circuit includes a charge-voltage converter.

One advantageous refinement of the present invention is characterized in that a minimum speed is specified, the period duration of a wheel rotation associated with the minimum speed is ascertained and the length in time of the predetermined cycle including at least three scanning points is selected to be equal to or greater than the period duration. This ensures that, in response to a detected rolling motion, the scanning extends at least over the time duration of a complete wheel rotation. In this context, the minimum speed is the speed beginning at which the presence of a rolling motion is to be detected with certainty.

Furthermore, the present invention includes a device having means designed for implementing the methods described above.

DETAILED DESCRIPTION OF THE INVENTION

The present invention makes possible the detection of rolling of a motor vehicle wheel, having the following advantages:

low current consumption low circuit expenditure implementable within the scope of an integrated circuit a sure differentiation of the conditions of "rolling" or "non-rolling" for the wheel, a spare wheel being carried in the vehicle having always to be detected as non-rolling robustness with respect to variance and aging of the components used, as well as with respect to the installation point in the wheel The present invention uses the output signals of a piezo-element. This output signal is scanned at certain scanning points in time, with the aid of a circuit configuration. Because of the selection of the scanning points in time according to the present invention, the invention enables a sure detection of a rolling motion, that is present, over a large range of speeds, for instance, from 20 km/h up to 250 km/h, using a very small number of scanning values. The number of scanning values that are required is typically below the number that would be required in an equidistant scanning by a factor of 5-10.

The circuit configuration is designed, in this context, in such a way that it has to be supplied with current only during the scanning points in time, and other than that, it is able to be in a current-saving passive mode. Based on this energy-saving property, it is possible to cover a long time interval using the scannings, even without high energy usage. This long time interval is necessary in order also to be able to detect motions at low speeds.

The rolling detection is carried out from the scanning values thus obtained, via simple signal processing. This signal processing is supported by the evaluation of the so-called fundamental wave, and will be described in greater detail. The evaluation of the fundamental wave lends great robustness to the system with respect to variance and aging, as well as special properties of the vehicle, of the wheel or of the tire, such as, for example, mechanical resonances.

In the system being introduced here, the sensor element may be mounted radially or tangentially in particular, but also in an intermediate direction, that is, it is able to record the accelerations occurring in the radial or the tangential wheel direction. The acceleration may be recorded, for example, via a piezoelectric element or via a micromechanical acceleration sensor which is mounted tangentially, for example.

Figure 1:
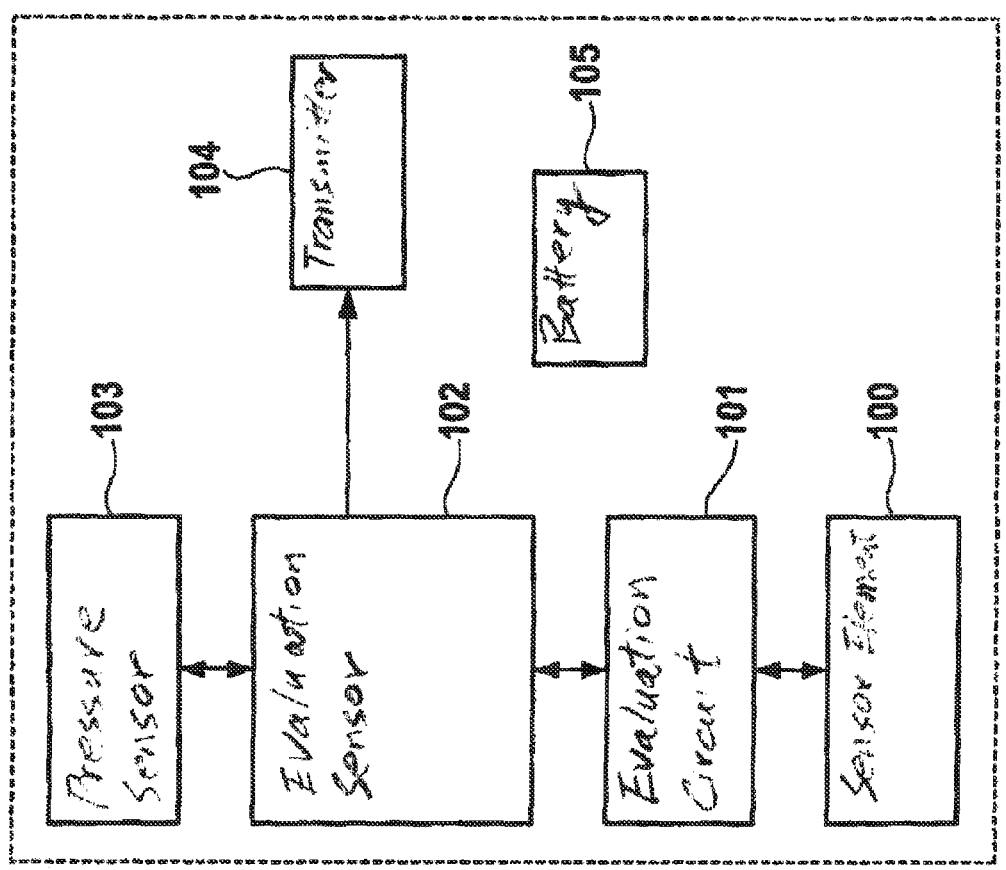
FIG. 1 shows the proportion of a tire pressure monitoring system that is located in the wheel.

In a schematic representation, FIG. 1 shows that part of a system for tire pressure monitoring which is located in the wheel. This part is made up of a pressure sensor 103, an evaluation sensor 102 for the evaluation of its output signal and a transmitter 104. For the purpose of a rolling detection, this system is supplemented by one or more sensor elements 100. Piezoceramics, for example, may be involved in this process, but the present invention is not limited to that type of sensor element. The signals of the rolling detection sensors are processed and evaluated in an evaluation circuit 101. The battery is denoted as 105.

In order to achieve great robustness at low costs per piece, as many as possible of the blocks shown in FIG. 1 are integrated into an integrated circuit or in a common housing.

In response to the rotation of the wheel, both in the tangential and in the radial direction, a sinusoidal acceleration curve is created.

In the radial direction, a centrifugal acceleration, that is constant at constant rotational speed, is superimposed on it. The sinusoidal curve caused by gravity has an amplitude of 1 g (with g=acceleration due to gravity), and the frequency is equivalent to the frequency of the wheel's rotation. The centrifugal acceleration superposed in the radial direction is able to amount to several hundred to several thousand g. Even in response to a rapidly accelerating vehicle, its value changes only slowly compared to the wheel rotation.

Figure 2:
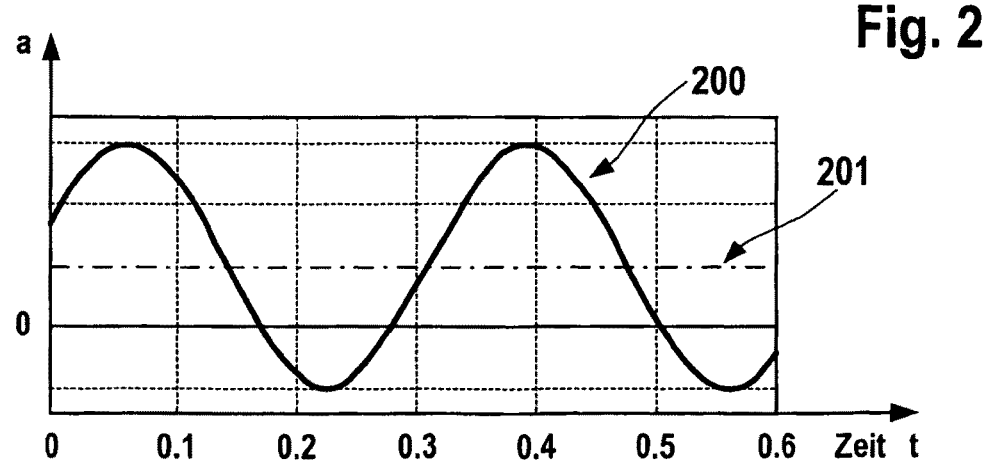
FIG. 2 shows the typical curve of the acceleration in response to a rotation of the wheel.

A typical curve of a recorded radial acceleration is shown in FIG. 2. In that figure, the time t is plotted in the abscissa direction and the recorded radial acceleration is plotted in the ordinate direction. Reference numeral 201 characterizes the constant or nearly constant component during the course of a wheel rotation that originates with the centrifugal acceleration, and 200 characterizes the sinusoidal component originating with the acceleration due to gravity.

Figure 3:
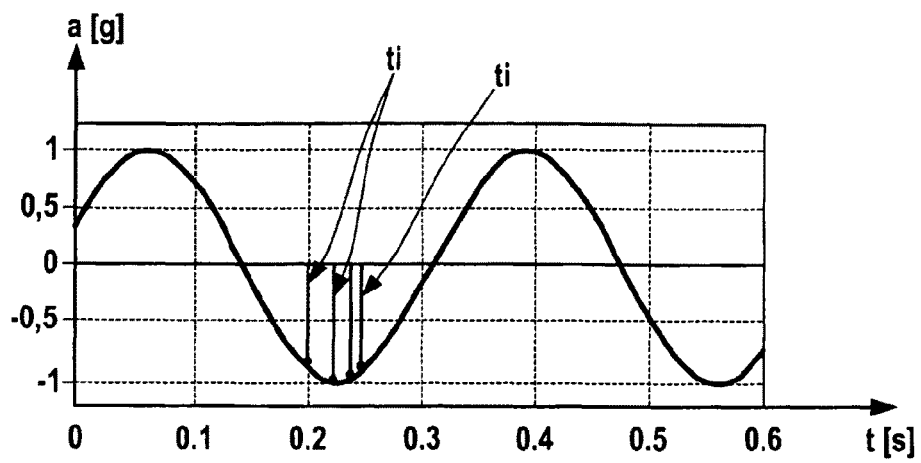
FIG. 3 shows a signal at the sensor output using nonequidistant scanning.

Sensor element 100 thereby converts the acceleration into a sinusoidal electrical signal. A possibly present centrifugal acceleration is filtered out by a separate high pass filter or by a high pass filtering property that is inherently already included in a piezo element (separate charges become equalized again via a high ohmic resistance in the piezo element). With that, there comes about a purely sinusoidal signal as shown in FIG. 3. As in FIG. 2, the time t is plotted in the abscissa direction, and an acceleration a is plotted in the ordinate direction. In the ordinate direction, one unit is equivalent to the acceleration due to gravity g, that is, one wheel rotation supplies a sinusoidal output signal having an amplitude g.

Figure 4:
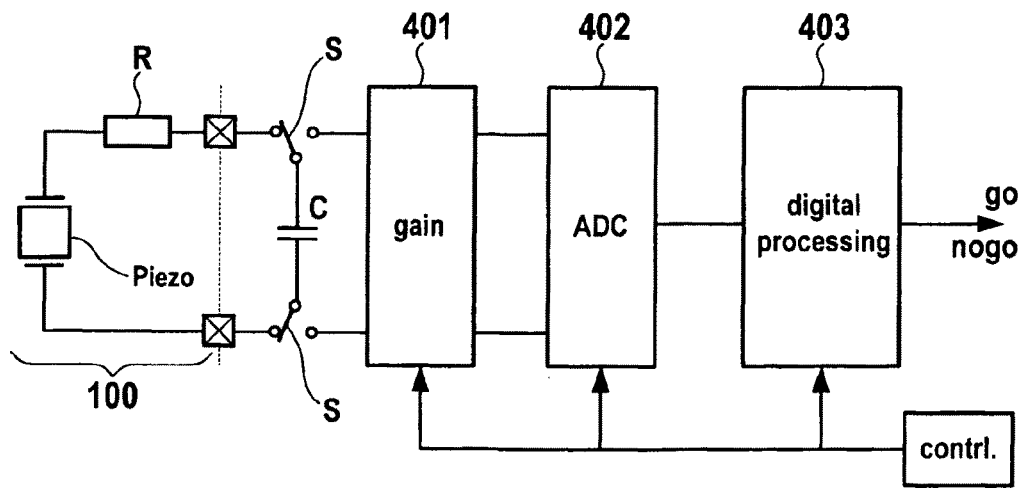
FIG. 4 shows a system for detecting the rolling motion.

A typical implementation of the entire system for rolling detection is shown in FIG. 4. If a rolling detection is to be carried out, the signal as shown in FIG. 3, that is sinusoidal in the case of a wheel rotation, is scanned at fixed points in time ti and is supplied to a Q/U converter 401. Due to a brief transfer of switch S, a part of the charge of capacitor C flows into the Q/U converter, which converts this discharging charge (with the aid of an operational amplifier and connected capacitors) into a voltage and amplifies it. This voltage is converted to a digital numerical value xi, with the aid of an analog/digital converter 402. From this it is calculated in calculation block 403 whether a standstill ("nogo") or a rolling wheel ("go") is at hand.

The scanning points in time ti, as shown in exemplary fashion in FIG. 3, are selected to be nonequidistant. One possibility is to let the intervals between two scanning points in time become ever shorter. Because of this nonequidistance, it is true that these scanning points in time are not equally distributed, but they are still specified in a fixed manner. In this way, a certain number of scanning points in time is recorded, typically 5 to 10 values.

Between the scanning processes, the circuit may be put in a stand-by mode, in order to save energy. This makes it possible to extend the observation period, that is, the time interval in which the scanning values lie, to such a degree that this time interval typically continues over a complete period in response to the slightest rolling speed that is to be detected.

In FIG. 4, the switches S, that are drawn in, are in the position that is shown almost the entire time. During this time, no evaluation takes place of the output signals of sensor 100, and the evaluation circuit made up of blocks 401, 402 and 403 is switched off or is deactivated or is in a current-saving passive mode. Piezo element 100 naturally also steadily supplies output signals even in this passive state, and the voltage at capacitor C follows the acceleration signal via the piezo element, its internal resistance R as well as the transmission function given to capacitor C. As soon as an evaluation is to take place, both switches S are briefly transferred to the right. That being the case, switches S are transferred briefly at each evaluation time ti.

The scanning values obtained are advantageously processed digitally in block 403. For this, in a first step, the maximum and minimum values of the scanning values are formed:

Xmax=max(xi) and
Xmin=min(xi)

In a second step, the difference y is formed from these:
y=Xmax−Xmin

This difference is compared to a barrier. If y is greater than this barrier value, a rolling motion is present, and otherwise it is not.

Figure 5:
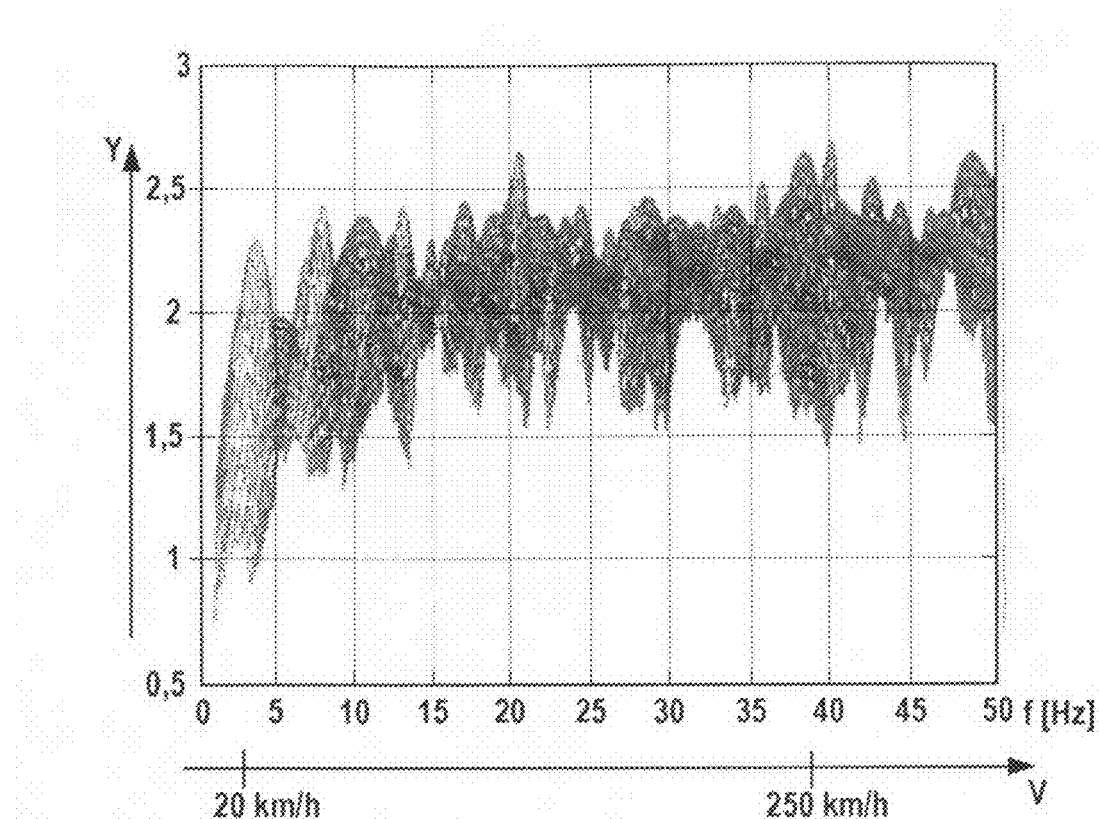
FIG. 5 shows the difference between ascertained maximum and minimum values, plotted over the rotational frequency of the wheel and over the vehicle speed.

In FIG. 5, the wheel's rotational frequency f is plotted in Hz in the abscissa direction, and the vehicle speed v, that is proportional to it, is plotted in km/h. The difference y is plotted in the ordinate direction. From this one may clearly see that, beginning at a minimum speed, this difference is always greater than 1 g. As the barrier, one might use the value 0.5 g.

For the simulation results plotted in FIG. 5, a large number of phase positions of the input signal was investigated. For this reason, FIG. 5 does not show a single characteristics curve, but a "tube-shaped" set of curves. It is important in this case that the minimum value of the set of curves, as of a certain frequency, is always clearly greater than a specified value of, for instance, 0.5 or 1.

The fact that in FIG. 5 values y>2 have also occurred is caused by the type of scanning used. In the scanning, during the brief transfer of switch S, in each case a part of the charge will discharge into the Q/U converter, that is, charge-voltage converter 401. Because of the discharging of the charge, there comes about a shifting in the voltage curve at capacitor C, which discharges again at a very large time constant. The charge discharging has the effect that the voltage dropping off at capacitor C no longer accurately agrees with the current acceleration value. Now, if a sign change takes place in the acceleration up to the next scanning value, this may cause a signal overshooting, that is, y>2.

Figure 6:
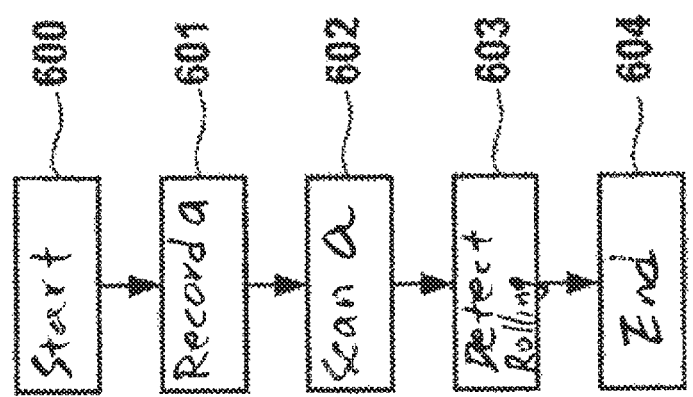
FIG. 6 shows the principal sequence of the method according to the present invention.

The sequence in principle of the method according to the present invention is shown in FIG. 6. After the start in block 600, in block 601 a wheel acceleration variable a, that characterizes a wheel acceleration, is recorded using at least one sensor element. In block 602, this wheel acceleration variable is scanned at various scanning points in time, and in block 603 the presence or nonpresence of a rolling motion is detected with the aid of the scanned values. The method ends in block 604.

It becomes clear, in this context, that an unequivocal detection of a rolling motion is still possible even in response to clear fluctuations in sensor sensitivity, based, for instance, on aging or a temperature change.

Besides the evaluation via the maximum and minimum values that was introduced, the formation of one or more weighted sums of the scanning values and subsequent comparison is also a possibility. So is the filtering of the scanning values and
combinations with a maximum value and a minimum value or the formation of a median and subsequent difference formation
with threshold value comparisons a possibility.

One important property of the digital signal evaluation described is that offsets in the scanning values may eliminated. These offsets may already be included in the signal, brought about by parasitic effects of the circuit or by the subsequent Q/U conversion, amplification and analog/digital conversion.

Fluctuations in the sensitivity of the overall system may be compensated for by a suitable adjustment of the barriers or the threshold values. To do this, one may use a follow-up of the signals over many measuring cycles, or the feeding in of self-generated signal values into the evaluation path. The circuit configuration presented may also be implemented in principle in analog circuit technology.

The invention claimed is:

1. A method for detecting a rolling motion of a wheel in a motor vehicle, comprising:
   recording over a specified period of time, using at least one sensor element, a wheel acceleration variable characterizing a wheel acceleration;

scanning the recorded wheel acceleration variable at multiple scanning points in time in a predetermined cycle of non-equidistant points in time including at least three scanning points in time; and detecting the presence of a rolling motion of a wheel with the aid of the scanned values of the recorded wheel acceleration variable;

wherein the non-equidistant scanning points in time are sequentially arranged within the predetermined cycle such that successive time intervals between two adjacent scanning points in time decrease.

2. The method as recited in claim 1, wherein the wheel acceleration variable is one of a radial acceleration or a tangential acceleration occurring at the wheel.

3. The method as recited in claim 1, wherein the wheel acceleration variable has at least one component relating to a radial acceleration.

4. The method as recited in claim 1, wherein the scanning cycle is repeated at specified times.

5. The method as recited in claim 1, wherein the method is applied in connection with a tire-pressure monitoring system, and the operating mode of the tire-pressure monitoring system is adjusted depending on whether the rolling motion has been detected as being present.

6. The method as recited in claim 5, wherein if the presence of the rolling motion has not been detected, tire pressure values ascertained by the tire-pressure monitoring system are one of (a) not transmitted or (b) transmitted at increased intervals.

7. The method as recited in claim 1, wherein the sensor element is a piezoceramic sensor element.

8. The method as recited in claim 7, wherein a capacitor is connected in parallel to the piezoceramic sensor element.

9. The method as recited in claim 8, wherein the detection of the presence of the rolling motion takes place using an electronic circuit, and wherein the electronic circuit is supplied with current only during the multiple scanning points in time.

10. The method as recited in claim 9, wherein the electronic circuit includes a charge-voltage converter.

11. The method as recited in claim 1, further comprising:
specifying a minimum speed;
ascertaining a duration of a period of a wheel rotation at the specified minimum speed; and
selecting the length in time of the predetermined cycle including at least three scanning points to be one of equal to or greater than the period duration.

12. A method for detecting a rolling motion of a wheel in a motor vehicle, the method comprising:
recording over a specified period of time, using at least one sensor element, a wheel acceleration variable characterizing a wheel acceleration;
scanning the recorded wheel acceleration variable at multiple scanning points in time in a predetermined cycle of non-equidistant points in time including at least three scanning points in time and
detecting the presence of a rolling motion of a wheel with the aid of the scanned values of the recorded wheel acceleration variable;
wherein the detection of the presence of the rolling motion of the wheel includes:
ascertaining, by the scanning, the maximum value of the recorded wheel acceleration variable within the predetermined cycle;
ascertaining, by the scanning, the minimum value of the recorded wheel acceleration variable within the predetermined cycle;
ascertaining the difference between the maximum value and the minimum value of the recorded wheel acceleration variable; and
detecting the presence of the rolling motion using the ascertained difference.

13. The method as recited in claim 12, wherein the rolling motion is detected as being present if the ascertained difference exceeds a specified threshold value.

14. A device for detecting a rolling motion of a wheel in a motor vehicle, comprising:
a recording arrangement to record over a specified period of time, using at least one sensor element, a wheel acceleration variable characterizing a wheel acceleration;
a scanning arrangement to scan the recorded wheel acceleration variable at multiple scanning points in time in a predetermined cycle of non-equidistant points in time including at least three scanning points in time; and
a detecting arrangement to detect the presence of a rolling motion of a wheel with the aid of the scanned values of the recorded wheel acceleration variable;
wherein the non-equidistant scanning points in time are sequentially arranged within the predetermined cycle such that successive time intervals between two adjacent scanning points in time decrease.

15. The device as recited in claim 14, wherein the wheel acceleration variable is one of a radial acceleration or a tangential acceleration occurring at the wheel.

16. The device as recited in claim 14, wherein the wheel acceleration variable has at least one component relating to a radial acceleration.

17. The device as recited in claim 14, wherein the rolling motion is detected as being present if an ascertained difference exceeds a specified threshold value.

18. The device as recited in claim 14, wherein the scanning cycle is repeated at specified times.

19. The device as recited in claim 14, wherein the device is used with a tire-pressure monitoring system, and the operating mode of the tire-pressure monitoring system is adjusted depending on whether the rolling motion has been detected as being present.

20. The device as recited in claim 19, wherein if the presence of the rolling motion has not been detected, tire pressure values ascertained by the tire-pressure monitoring system are one of (a) not transmitted or (b) transmitted at increased intervals.

21. The device as recited in claim 14, wherein the sensor element is a piezoceramic sensor element.

22. The device as recited in claim 21, wherein a capacitor is connected in parallel to the piezoceramic sensor element.

23. The device as recited in claim 22, wherein the detection of the presence of the rolling motion takes place using an electronic circuit, and wherein the electronic circuit is supplied with current only during the multiple scanning points in time.

24. The device as recited in claim 23, wherein the electronic circuit includes a charge-voltage converter.

25. The device as recited in claim 14, wherein a minimum speed is specified, a duration of a period of a wheel rotation at the specified minimum speed is ascertained, and the length in time of the predetermined cycle including at least three scanning points is selected to be one of equal to or greater than the period duration.

26. A device for detecting a rolling motion of a wheel in a motor vehicle, comprising:
a recording arrangement to record over a specified period of time, using at least one sensor element, a wheel acceleration variable characterizing a wheel acceleration;

a scanning arrangement to scan the recorded wheel acceleration variable at multiple scanning points in time in a predetermined cycle of non-equidistant points in time including at least three scanning points in time; and a detecting arrangement to detect the presence of a rolling motion of a wheel with the aid of the scanned values of the recorded wheel acceleration variable;

wherein the detection of the presence of the rolling motion of the wheel includes ascertaining, by the scanning, the maximum value of the recorded wheel acceleration variable within the predetermined cycle, ascertaining, by the scanning, the minimum value of the recorded wheel acceleration variable within the predetermined cycle, ascertaining the difference between the maximum value and the minimum value of the recorded wheel acceleration variable, and detecting the presence of the rolling motion using the ascertained difference.

* * * * *

UNITED STATES PATENT AND TRADEMARK OFFICE
CERTIFICATE OF CORRECTION

PATENT NO.       : 8,423,236 B2                                                Page 1 of 1
APPLICATION NO. : 12/308473
DATED            : April 16, 2013
INVENTOR(S)      : Neuscheler et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1004 days.

Signed and Sealed this

Eighth Day of September, 2015

Michelle K. Lee
*Director of the United States Patent and Trademark Office*